United States Patent
Tonar et al.

(10) Patent No.: US 10,214,147 B2
(45) Date of Patent: *Feb. 26, 2019

(54) TIGHT BEZEL-TO-GLASS FIT MIRROR ASSEMBLY

(71) Applicant: Gentex Corporation, Zeeland, MI (US)

(72) Inventors: William L. Tonar, Holland, MI (US); Joel A. Stray, Hudsonville, MI (US); Danny L. Minikey, Jr., Fenwick, MI (US); Mathias R. Fox, Zeeland, MI (US); Kenneth R. Filipiak, West Olive, MI (US); Niels A. Olesen, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/366,492

(22) Filed: Dec. 1, 2016

(65) Prior Publication Data

US 2017/0158139 A1    Jun. 8, 2017

Related U.S. Application Data

(60) Provisional application No. 62/263,312, filed on Dec. 4, 2015, provisional application No. 62/414,199, filed on Oct. 28, 2016.

(51) Int. Cl.
*B60R 1/08* (2006.01)
*B60R 1/04* (2006.01)
(Continued)

(52) U.S. Cl.
CPC ............. *B60R 1/088* (2013.01); *B60R 1/04* (2013.01); *G02B 5/08* (2013.01); *G02F 1/153* (2013.01);
(Continued)

(58) Field of Classification Search
CPC .... B60R 1/02; B60R 1/04; B60R 1/06; B60R 1/08; B60R 1/082; B60R 1/083;
(Continued)

(56) References Cited

U.S. PATENT DOCUMENTS 3,280,701 A   10/1966   Donnelly et al.
4,902,108 A   2/1990    Byker
(Continued)

OTHER PUBLICATIONS

International Search Report and Written Opinion of the International Searching Authority, or the Declaration, dated Apr. 6, 2017, for International Application No. PCT/US 2016/064402 filed Dec. 1, 2016; 8 pages.

*Primary Examiner* — Loha Ben
(74) *Attorney, Agent, or Firm* — Price Heneveld LLP; Bradley D. Johnson

(57) ABSTRACT

A rearview mirror assembly includes a housing, a bezel and an electro-optic mirror element. The electro-optic mirror element includes a first substantially transparent substrate having an edge extending around at least a portion of a perimeter of the first substantially transparent substrate and a second substrate having a second edge extending around at least a portion of a perimeter of the second substrate and a fourth surface. The first substantially transparent substrate and the second substrate define a cavity therebetween. An electro-optic material is disposed within the cavity. The edge of the first substantially transparent substrate and the second edge of the second substrate are coupled to at least one of the bezel and the housing.

20 Claims, 6 Drawing Sheets

(51) Int. Cl.
  *G02F 1/161* (2006.01)
  *G02F 1/15* (2006.01)
  *G02F 1/157* (2006.01)
  *G02B 5/08* (2006.01)
  *G02F 1/153* (2006.01)
  G09G 3/38 (2006.01)

(52) U.S. Cl.
  CPC .............. *G02F 1/157* (2013.01); *G02F 1/161* (2013.01); *B60R 1/08* (2013.01); *G02F 1/15* (2013.01); *G09G 3/38* (2013.01)

(58) Field of Classification Search
  CPC ........... B60R 1/086–1/088; B60R 1/12; B60R 1/1207; B60R 2001/1215; G09G 3/38; G02F 1/01; G02F 1/133553; G02F 1/15; G02F 1/153; G02F 1/1533; G02F 1/155; G02F 1/157; G02F 1/161; G02F 1/163; G02B 5/08; G02B 5/085
  USPC ............... 359/245, 263, 265, 267, 603, 605; 345/105; 362/494
  See application file for complete search history.

(56) References Cited

U.S. PATENT DOCUMENTS

| | | | |
|---|---|---|---|
| 5,066,112 A | 11/1991 | Lynam et al. | |
| 5,069,535 A | 12/1991 | Baucke et al. | |
| 5,073,012 A | 12/1991 | Lynam | |
| 5,076,673 A | 12/1991 | Lynam et al. | |
| 5,115,346 A | 5/1992 | Lynam | |
| 5,158,638 A | 10/1992 | Osanami et al. | |
| 5,253,109 A | 10/1993 | O'Farrell et al. | |
| 5,421,940 A | 6/1995 | Cornils et al. | |
| 5,649,756 A | 7/1997 | Adams et al. | |
| 5,790,298 A | 8/1998 | Tonar | |
| 5,818,625 A | 10/1998 | Forgette et al. | |
| 5,923,457 A | 7/1999 | Byker et al. | |
| 6,064,508 A | 5/2000 | Forgette et al. | |
| 6,068,380 A | 5/2000 | Lynn et al. | |
| 6,102,546 A | 8/2000 | Carter | |
| 6,170,956 B1 | 1/2001 | Rumsey et al. | |
| 6,195,194 B1 | 2/2001 | Roberts et al. | |
| 6,239,899 B1 | 5/2001 | DeVries et al. | |
| 6,249,369 B1 | 6/2001 | Theiste et al. | |
| 6,317,248 B1 | 11/2001 | Agrawal et al. | |
| 6,407,468 B1 | 6/2002 | LeVesque et al. | |
| 6,407,847 B1 | 6/2002 | Poll et al. | |
| 6,606,183 B2 | 8/2003 | Ikai et al. | |
| 7,324,261 B2 | 1/2008 | Tonar et al. | |
| 7,391,563 B2* | 6/2008 | McCabe ................ | B60R 1/088 359/345 |
| 7,542,193 B2* | 6/2009 | McCabe ................ | B60R 1/088 359/247 |
| 7,688,495 B2* | 3/2010 | Tonar ...................... | B60R 1/084 359/245 |
| 7,826,123 B2* | 11/2010 | McCabe ................ | B60R 1/088 359/265 |
| 8,169,684 B2* | 5/2012 | Bugno .................... | B60R 1/088 359/265 |
| 8,277,059 B2* | 10/2012 | McCabe ................ | B60R 1/088 359/603 |
| 8,506,096 B2* | 8/2013 | McCabe ................ | B60R 1/088 359/604 |
| 8,727,547 B2* | 5/2014 | McCabe ................ | B60R 1/088 359/603 |
| 8,827,517 B2* | 9/2014 | Cammenga ............. | B60R 1/088 359/841 |
| 9,090,211 B2* | 7/2015 | McCabe ................ | B60R 1/088 |
| 9,341,914 B2* | 5/2016 | McCabe ................ | B60R 1/088 |
| 9,827,912 B2* | 11/2017 | Olesen ...................... | B60R 1/04 |
| 9,878,670 B2* | 1/2018 | McCabe ................ | B60R 1/088 |
| 2002/0171906 A1 | 11/2002 | Busscher et al. | |
| 2013/0088884 A1 | 4/2013 | Brummel et al. | |
| 2015/0321611 A1 | 11/2015 | Lock et al. | |
| 2018/0015880 A1* | 1/2018 | Olesen .................... | B60R 1/088 |
| 2018/0024401 A1* | 1/2018 | Stray ....................... | B60R 1/087 359/876 |

\* cited by examiner

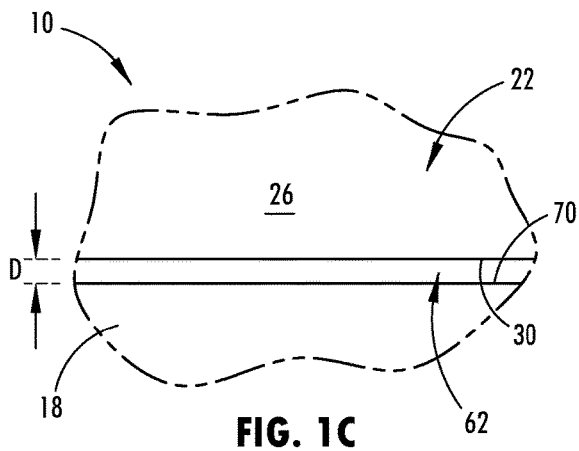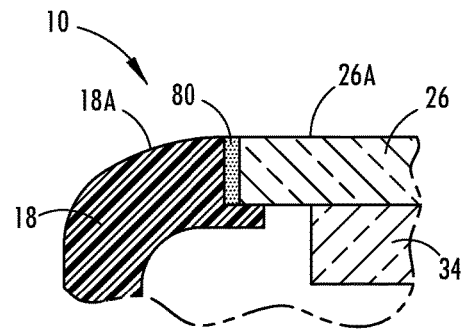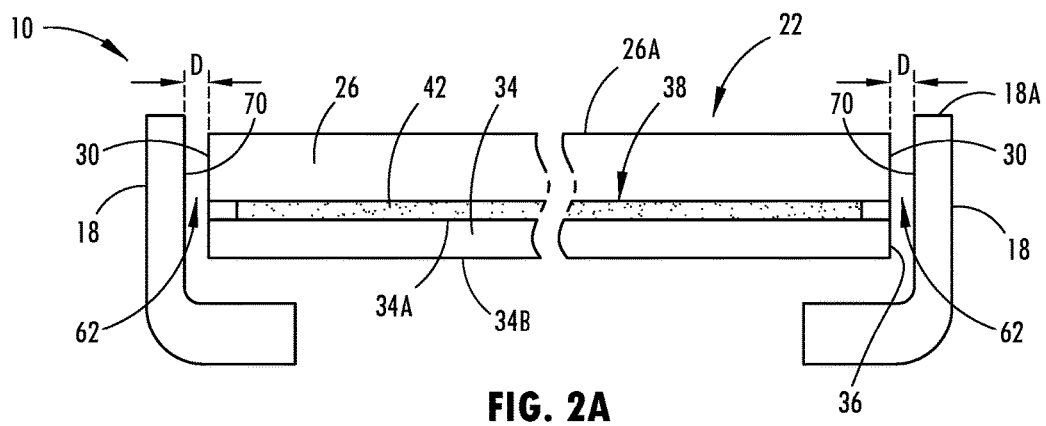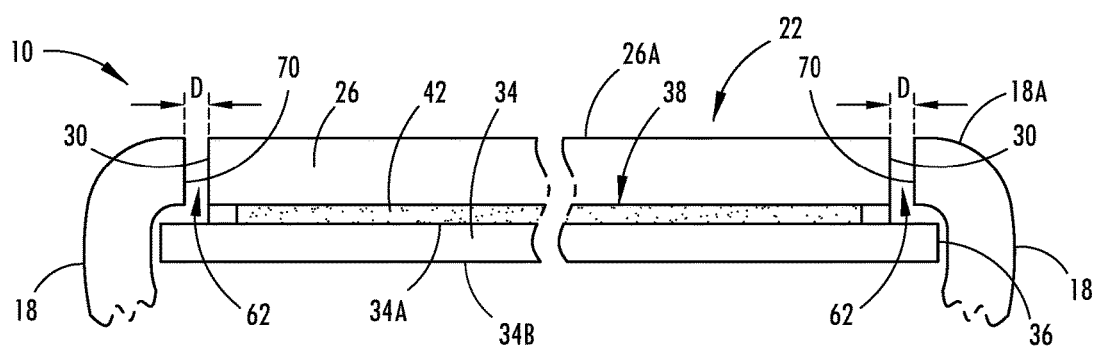

TIGHT BEZEL-TO-GLASS FIT MIRROR ASSEMBLY

CROSS-REFERENCE TO RELATED APPLICATIONS

This application claims the benefit of and priority to U.S. Provisional Patent Application No. 62/263,312, filed on Dec. 4, 2015, entitled ELECTRO-OPTIC ASSEMBLY, U.S. Provisional Patent Application No. 62/414,199, filed on Oct. 28, 2016, entitled TIGHT BEZEL-TO-GLASS FIT MIRROR ASSEMBLY the entire disclosures of which are hereby incorporated herein by reference.

FIELD OF THE DISCLOSURE

The present disclosure generally relates to a rearview mirror assembly, and more particularly, a rearview mirror assembly having a tight bezel-to-glass fit.

BACKGROUND OF THE DISCLOSURE

In many mirror products today, a very uniform fit between an edge of a glass shape and a surrounding flush mounted bezel or housing is desired to produce an aesthetically pleasing product. A large or non-uniform gap between the glass edge and the bezel or housing is unsightly. A uniform gap produces a smooth, pleasing, seamless transition between the bezel or housing and the mirror element. Lack of uniformity in the gap of traditional mirror products may be attributed to conventional cutting techniques including scribe and break, abrasive wheel, and water jet cutting techniques. Large gaps may be present between bezels and/or housings and the glass of the mirror products to prevent the accumulation of stress in the glass as the mirror product undergoes a change in thermal conditions such as a change in size due to thermal expansion or contraction. The gaps may provide a space for the mirror glass, bezel, and/or housing with different thermal expansion coefficients to expand and contract into without causing damage to the glass.

SUMMARY OF THE PRESENT DISCLOSURE

According to one example of this disclosure, a rearview mirror assembly includes a housing, a bezel and an electro-optic mirror element. The electro-optic mirror element includes a first substantially transparent substrate having an edge extending around at least a portion of a perimeter of the first substantially transparent substrate and a second substrate having a second edge extending around at least a portion of a perimeter of the second substrate and a fourth surface. The first substantially transparent substrate and the second substrate define a cavity therebetween. An electro-optic material is disposed within the cavity. The edge of the first substantially transparent substrate and the second edge of the second substrate are coupled to at least one of the bezel and the housing.

According to another example of this disclosure, a rearview mirror assembly includes a bezel and an electro-optic mirror element. The electro-optic mirror element includes a first substrate having an edge extending around at least a portion of a perimeter of the first substrate and a second substrate having a second edge extending around at least a portion of a perimeter of the second substrate and a fourth surface. The first substrate and the second substrate define a cavity therebetween. An electro-optic material is disposed within the cavity. At least one of the edge of the first substrate and the second edge of the second substrate are coupled to the bezel.

According to another example of this disclosure, a rearview mirror assembly includes a bezel and an electro-optic mirror element. The electro-optic element includes a first substrate having an edge extending around at least a portion of a perimeter of the first substrate and a second substrate having a second edge extending around at least a portion of a perimeter of the second substrate and a fourth surface. The first substrate and the second substrate define a cavity therebetween. An electro-optic material disposed within the cavity. The bezel extends onto the fourth surface of the second substrate.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

BRIEF DESCRIPTION OF THE DRAWINGS

In the drawings:

FIG. 1C is an enlarged front view of the rearview mirror assembly of FIG. 1A taken at IC;

FIG. 1D is an illustration of a cross-sectional view of the rearview mirror assembly according to one embodiment taken at line II of FIG. 1A;

FIG. 2A is an illustration of a cross-sectional view of the rearview mirror assembly according to one embodiment taken at line II of FIG. 1A;

FIG. 2B is an illustration of a cross-sectional view of the rearview mirror assembly according to another embodiment taken at line II of FIG. 1A;

DETAILED DESCRIPTION OF EMBODIMENTS

Figure 1A:
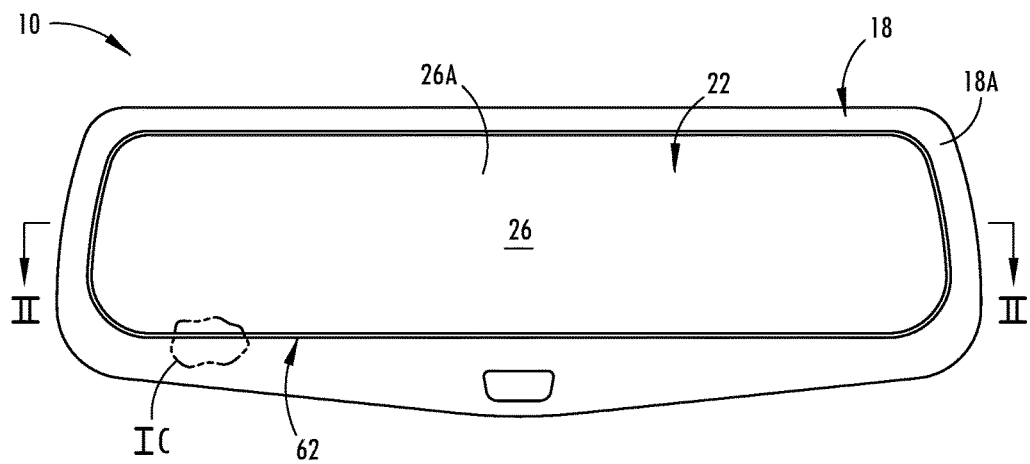
FIG. 1A is a front view of a rearview mirror assembly of the present disclosure.

The present illustrated embodiments reside primarily in combinations of method steps and apparatus components related to rearview mirror assemblies. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1A-3B, reference numeral 10 generally designates a rearview mirror assembly. The review mirror assembly 10 includes a housing 14 and a bezel 18. The bezel 18 defines a bezel first surface 18A. Positioned within the rearview mirror assembly 10 is an electro-optic element 22. The electro-optic element 22 may be a mirror element. The electro-optic element 22 has a first substantially transparent substrate 26 having a first surface 26A and an edge 30 extending around at least a portion of a perimeter of the first substantially transparent substrate 26. The electro-optic element 22 also includes a second substantially transparent substrate 34. It will be understood that some embodiments of the second substrate 34 are not transparent. The first and second substantially transparent substrates 26, 34 define a cavity 38 in which an electro-optic material 42 is disposed. The edge 30 of the first substantially transparent substrate 26 and at least one of the housing 14 and bezel 18 have a substantially line-to-line (or "line-on-line") fit.

Figure 1B:
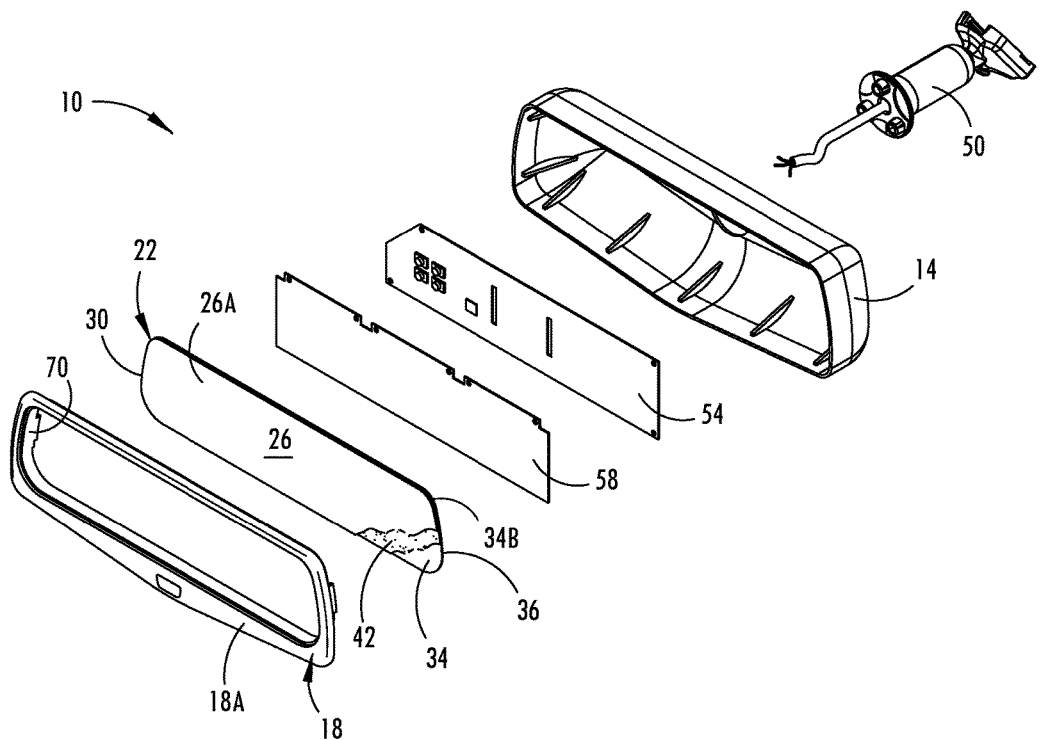
FIG. 1B is a top perspective exploded view of the rearview mirror assembly of FIG. 1A.

With reference now to the depicted embodiment of FIGS. 1A and 1B, the illustrated rearview mirror assembly 10 can be an interior rearview assembly positioned within an interior of a vehicle. When the rearview mirror assembly 10 is an interior rearview assembly, the rearview mirror assembly 10 may be connected to a mount 50, which is adapted to be mounted inside the vehicle in a location proximate to or on a front windshield of the vehicle. It should be noted that the present disclosure is equally applicable to exterior mirrors, as well as other optical assemblies positioned within bezels and housings. The first substrate 26 may include a variety of transparent materials transparent in the visible region of the electromagnetic spectrum including soda-lime float glass, EAGLE® glass, alkaline earth boro-aluminosilicate glass, GORILLA® glass, alkali-aluminosilicate glass, chemically strengthened glass, insulated glass, tempered glass, sapphire, optical crystals, diamond, quartz, ceramics, polymers or plastics. The second substrate 34 may include the same materials as the first substrate 26, but does not need to be transparent and therefore may include polymers, metals, glass, ceramics, and/or composites. The bezel 18 may be formed of a thermosetting polymer (e.g., a reactive injection molding (RIM) suitable polymer, reinforced RIM suitable polymer, a structural RIM suitable polymer, a castable polymer and combinations thereof) and/or a thermoplastic polymer (e.g., polycarbonate, nylon, acrylic, combinations thereof, etc.). In some embodiments, the bezel 18 may include a clear polymeric material. The bezel 18 may be formed via machining, casting, resin transfer molding, reactive injection molding, injection molding, and/or compression injection molding. Similarly to the first substrate 26, the second substrate 34 defines a second edge 36. The first and second substrates 26, 34 may have a thickness between about 0.1 mm to about 3.0 mm, between about 0.5 mm to about 2.2 mm, or between about 0.8 mm to about 1.6 mm. In some embodiments, the thicknesses of the first and second substrates 26, 34 may differ from one another. Furthermore, a reflector material may be located on either a front surface or a rear surface of the second substrate 34, depending upon the type of electro-optic element 22. The second substrate 34 defines a third surface 34A (FIG. 2A) and a fourth surface 34B (FIG. 1B).

The rearview mirror assembly 10 also includes a circuit board 54 and a carrier plate 58. The carrier plate 58 can be located behind the electro-optic element 22 and have the circuit board 54 connected thereto. If the rearview mirror assembly 10 is an interior rearview assembly, the carrier plate 58 is typically fixed in position within the housing 14. The carrier plate 58 of the rearview mirror assembly 10 can be used to maintain the position of the electro-optic element 22 and/or carry the circuit board 54. An example of an interior rearview assembly including a carrier plate and a circuit board is disclosed in U.S. Pat. No. 6,239,899, entitled "MIRROR WITH INTERNAL SUPPORT PLATE," assigned to Gentex Corporation, the entirety of which is hereby incorporated herein by reference. In the rearview mirror assembly 10, the carrier plate 58 assists in maintaining the electro-optic element 22 in position within the housing 14. An example of the housing 14, bezel 18, carrier plate 58, circuit board 54 and their interconnections may be found in U.S. Patent Application Publication No. 2005/0152054 entitled "REFLECTIVE ELEMENT HOLDER FOR REARVIEW MIRROR," assigned to Gentex Corporation, the entirety of which is hereby incorporated herein by reference. However, it is contemplated that the rearview mirror assembly 10 could have a bezel, circuit board 54 and/or carrier plate 58 omitted from the rearview mirror assembly 10.

The illustrated electro-optic element 22 has the electro-optic material 42 positioned between the first substrate 26 and the second substrate 34. In some embodiments, the electro-optic material 42 may be an electrochromic material.

In such embodiments, the electro-optic material 42 may be a solution phase as disclosed in U.S. Pat. No. 4,902,108 entitled "SINGLE-COMPARTMENT, SELF-ERASING, SOLUTION-PHASE ELECTROCHROMIC DEVICES, SOLUTIONS FOR USE THEREIN, AND USES THEREOF" and U.S. Pat. No. 5,278,693 entitled "TINTED SOLUTION-PHASE ELECTROCHROMIC MIRRORS," commonly assigned to Gentex Corporation, both of which are hereby incorporated in their entirety herein. In other embodiments, the electro-optic material 42 may be in a solid-state. In addition, a hybrid system where part of the electro-optic medium 42 is solid-state and part is solution phase is also contemplated. Solution-phase materials, because of their liquidic or flowable properties, do not rigidly bond the first and second substrates 26, 34 together like completely solid-state electro-optic material 42. The electro-optic material 42 may have a thickness between about 1 micron and about 1000 microns.

The flexibility of the electro-optic element 22 may be dependent on a variety of factors, including thickness of the first and second substrates 26, 34, type (e.g., solution-phase or solid-state) of electro-optic material 42, and overall thickness of the electro-optic element 22. For example, in embodiments of the rearview mirror assembly 10 having solid-state electro-optic material 42, the first and second substrates 26, 34 are bonded together in a manner that causes them to bend much like a piece having their total thickness. Contrastingly, electro-optic elements 22 having a solution-phase electro-optic material 42 bend in a complex manner wherein the first and second substrates 26, 34 bend simultaneously, but independently. Additionally, the solution-phase electro-optic material 42 may ebb and flow somewhat in reaction to the stress. The net result is that the electro-optic element 22, in embodiments with solution-phase electro-optic material 42, tends to be more flexible than electro-optic elements 22 with solid-state phase electro-optic material 42, even where the first and second substrates 26, 34 have the same thickness and other properties.

The first and second substrates 26, 34 may be cut to shape in a variety of processes. In one embodiment, the first and second substrates 26, 34 are cut to shape with the use of a score and break technique. In another embodiment, an abrasive wheel or a high-pressure water jet may be used to cut the first and second substrates 26, 34. In yet another embodiment, the first and second substrates 26, 34 may be cut using a laser. Examples of laser systems and laser cutting are described in U.S. Pat. No. 8,842,358, entitled "APPARATUS, METHOD, AND PROCESS WITH LASER INDUCED CHANNEL EDGE" and U.S. Patent Application Publication No. 2014/0034616, entitled "LASER SYSTEM AND METHOD THEREOF," each of which is assigned to Gentex Corporation and is hereby incorporated herein by reference in its entirety. The roughness of the edge and second edge 30, 36 cut via a laser cutting process can have an Rq value of less than approximately 1.6, an Rq value of less than approximately 1.5, an Rq value of less than approximately 1.3, an Rq value of less than approximately 1.2, an Rq value ranging from and including approximately 0.9 to approximately 1.6, an Rq value ranging from and including approximately 1.0 to approximately 1.5, an Rq value ranging from and including approximately 1.1 to approximately 1.4, an Rq value of approximately 1.16, or a combination thereof.

Referring now to FIG. 1C, in assembly, the bezel 18 and the edge 30 of the first substrate 26 are capable of having a line-to-line fit, or a very tight fit. A gap 62 is defined in the rearview mirror assembly 10 between the bezel 18 and the electro-optic element 22. The gap 62 extends a distance D between an inner surface 70 of the bezel 18 and the edge 30 of the first substrate 26 or the second edge 36 of the second substrate 34. The distance D may be smaller than about 0.5 mm, than about 0.4 mm, than about 0.3 mm, than about 0.2 mm, than about 0.1 mm or smaller than about 0.05 mm when measured at about 25° C. In embodiments not utilizing the bezel 18, the gap 62 between the housing 14 and the edge or second edge 30, 36 may have the same or similar distance D as the bezel 18 and the edge and second edge 30, 36. The gap 62 may have a substantially uniform distance D around the electro-optic element 22. The gap 62 may have a sufficiently small distance D so as not to be noticeable by an observer at a typical distance (e.g., a distance from a driver or passenger's head to the rearview mirror assembly 10). It should be understood that embodiments of the rearview mirror assembly 10 not including a bezel 18 may still have a line-to-line fit with the housing 14 and that the gap 62 may alternatively be defined between the edge 30 or second edge 36 and the housing 14.

Referring now to FIG. 1D, in various embodiments, a filler 80 may be disposed within the gap 62. The filler 80 may fill the gap 62 such that the filler 80 is flush or substantially flush with the first surface 26A of the first substrate 26 and the bezel first surface 18A of the bezel 18. The filler 80 may be an adhesive, resin, acrylate, methacrylate, urethane, epoxy, silicone, polysulfide and/or polyolefin. The filler 80 may be a thermoplastic, a thermoset or cured by ultraviolet light or moisture. In assembly, the filler 80 is configured to fill in the gap 62 such that it is not noticeable by an observer at typical viewing distances of the rearview mirror assembly 10. In embodiments where the filler 80 is flexible (e.g., a silicone or urethane elastomer), the filler 80 may aid in stress reduction within the rearview mirror assembly 10 by flexing to absorb stresses generated (e.g., by thermal changes) within the assembly 10. Additionally or alternatively, the filler 80 may be an adhesive configured to bond two or more materials together (e.g., glass and plastic) in molding applications.

Figure 2C:
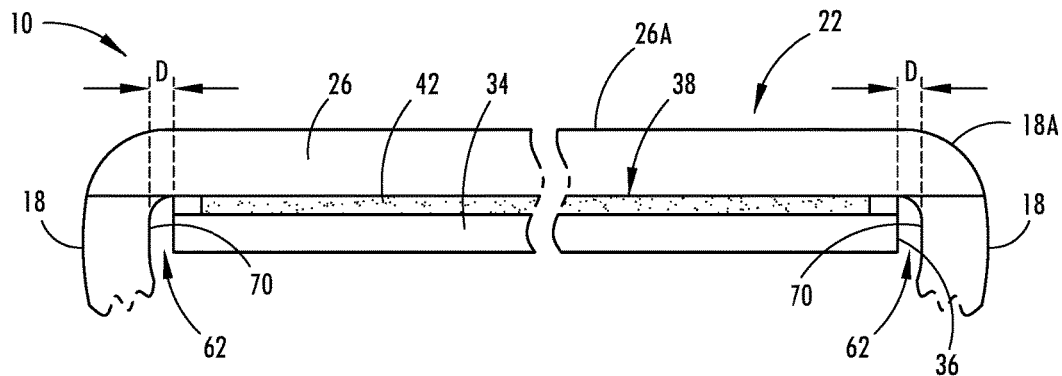
FIG. 2C is an illustration of a cross-sectional view of the rearview mirror assembly according to yet another embodiment taken at line II of FIG. 1A.
Figure 2D:
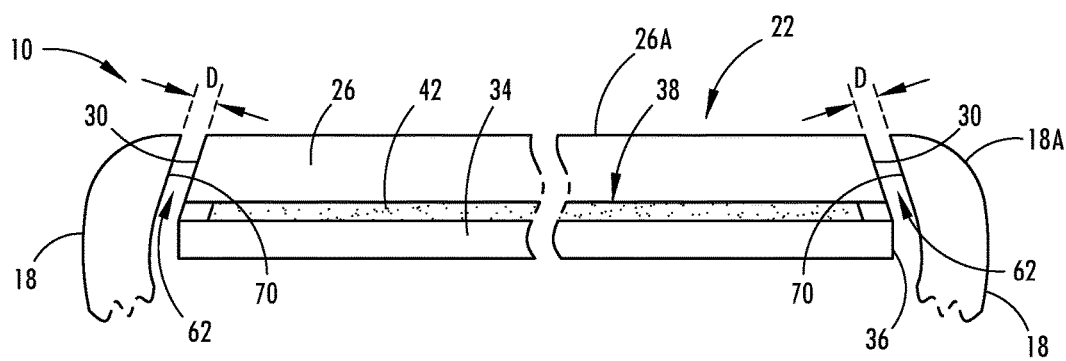
FIG. 2D is an illustration of a cross-sectional view of the rearview mirror assembly according to yet another embodiment taken at line II of FIG. 1A.

Referring now to FIGS. 2A-C, the orientation of the bezel 18 relative to the electro-optic element 22 may take a variety of configurations, each defining the gap 62 between the electro-optic element 22 and the bezel 18. The small distances D of the gap 62 may be advantageous for a variety of reasons. For example, in embodiments where there is little or no positional offset between the first and second substrates 26, 34, similar to that depicted in FIG. 2A, the distance D may be small to reduce the visibility of a separation between the first or second substrates 26, 34 of the electro-optic element 22 and the bezel 18 or housing 14 of the rearview assembly 10. A tight fit between the bezel 18 and the electro-optic element 22 may give the appearance of a greater viewing area as well as a decrease in the apparent thickness of the bezel 18. In embodiments of the electro-optic element 22 where there exists a positional offset similar to that depicted in FIG. 2B, the decreased size of the gap 62 between the inner surface 70 of the bezel 18 and the edge 30 of the first substrate 26 allows for a greater sized first substrate 26, giving the appearance of a fuller view to the driver of the vehicle. Additionally, a smaller distance D leads to a more continuous appearance between the bezel 18 and the electro-optic element 22 and decreases the visibility of the gap 62 between the bezel 18 and the electro-optic element 22. In embodiments such as depicted in FIG. 2C, it may be advantageous to minimize the distance D of the gap 62 to decrease the size of a chrome ring positioned on a rear, or inner, surface of the first substrate 26. Chrome rings are used to conceal the bezel 18, associated electronics and seals, and the gap 62. Accordingly, by reducing the size of the gap 62, a decrease in size of the chrome ring may be realized which may result in an increased perceived viewing area of the rearview mirror assembly 10. In embodiments similar to that depicted in FIG. 2D, the small gap 62 between the bezel 18 and the first substrate 26 allows for a decreased visibility of the separation between the bezel 18 and the electro-optic element 22.

Traditionally, design of a bezel 18 or housing 14 around the electro-optic element 22 takes into account the differences in the coefficient of thermal expansion ("CTE") of the materials used in the electro-optic element 22, as well as the bezel 18 and housing 14. Polymeric materials typically have a greater CTE than glass, ceramic, or metal components. This means that as the temperature of the rearview mirror assembly 10 changes, the different materials of the rearview mirror assembly 10 expand and contract at different rates. The differential expansion of the components of the rearview mirror assembly 10 may result in the generation of stresses within the assembly 10 if not properly accounted for. In the case of automotive applications, typical temperature testing takes place in a range between about −40° C. to about 105° C. Conventional bezels are made out of strong and fairly rigid engineering plastics such as polypropylene, Acrylonitrile butadiene styrene/polycarbonate, acrylonitrile styrene acrylate, and have thermal expansion coefficients that are much larger than glasses, ceramics, and metals. This expansion difference can create hoop stress as conventional bezels shrink around glass and metal elements at cold temperatures. As a result, conventional bezels may have ribs or large gaps to accommodate the different thermal size changes between bezels/housings and mirrors.

Depending on processing and material parameters, molded parts (e.g., the housing 14 or bezel 18) can vary in size significantly (e.g., about 0.4 mm) from piece to piece or from run to run. As such, to hold the distance D of gap 62 to a minimum and to maintain consistency in the distance D of the gap 62 from part to part, it may be desirable to post-machine the inner surface 70 of the bezel 18, machine the first or second substrates 26, 34 or it may be desirable to measure the inside dimensions of the bezel 18 and then cut edge 30 of the first substrate 26 to match. This process is applicable to both single-shot molding operations, including one mold with one cavity size, as well as multi-shot molding operations having multiple molds, each of which can include different cavity sizes.

Figure 3A:
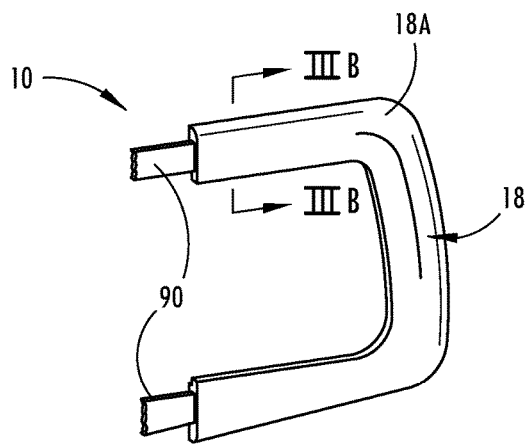
FIG. 3A is a perspective view of a bezel in assembly according to one embodiment.
Figure 3B:
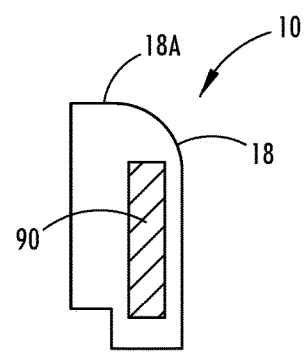
FIG. 3B is a cross-sectional view of the rearview mirror assembly according to one embodiment taken at line IIIB of FIG. 3A.
Figure 3C:
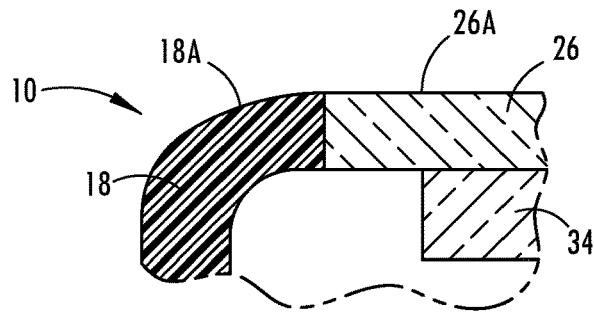
FIG. 3C is an illustration of an enlarged cross-sectional view of the rearview mirror assembly according to yet another embodiment taken at line II of FIG. 1A.
Figure 3D:
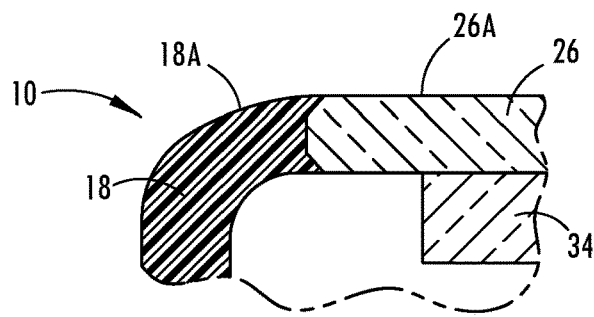
FIG. 3D is an illustration of an enlarged cross-sectional view of the rearview mirror assembly according to yet another embodiment taken at line II of FIG. 1A.
Figure 3E:
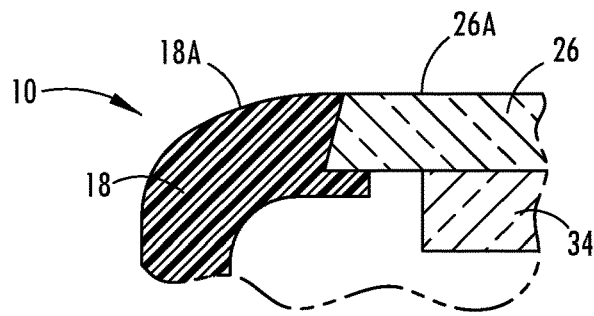
FIG. 3E is an illustration of an enlarged cross-sectional view of the rearview mirror assembly according to yet another embodiment taken at line II of FIG. 1A.
Figure 3F:
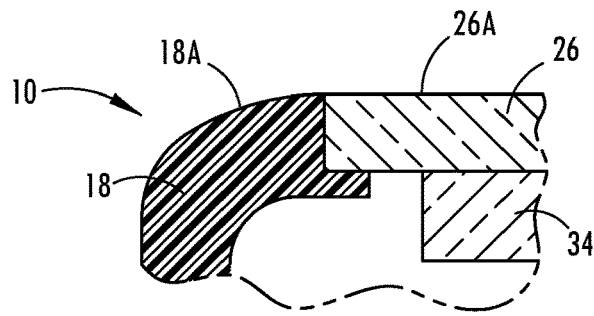
FIG. 3F is an illustration of an enlarged cross-sectional view of the rearview mirror assembly according to yet another embodiment taken at line II of FIG. 1A.

Referring now to FIGS. 3A and 3B, the rearview mirror assembly 10 may optionally include a reinforcement 90 positioned within the bezel 18. The reinforcement 90 may be a continuous or discontinuous structure extending through the bezel 18. In continuous embodiments, the reinforcement 90 may form a continuous loop such that the electro-optic element 22 is substantially encircled. In discontinuous embodiments, the reinforcement 90 may include a plurality of portions positioned around the bezel 18. For example, the reinforcement 90 may include two separate portions, each of which extend along a top or bottom of the bezel 18. The reinforcement 90 may have a variety of cross-sectional configurations. For example, the cross-sectional configuration of the reinforcement 90 may include circular, triangular, rectangular, and square configurations and may vary across the reinforcement 90. The reinforcement 90 may comprise a variety of materials, including polymers, metals, ceramics, glasses, and fibers. In polymeric embodiments of the reinforcement 90, the polymer used may be an extremely low CTE polymer, or a composite material having a polymer and a high volume fraction of low CTE filler material. Metallic embodiments of the reinforcement 90 may include metals such as aluminum, steel, stainless steel, Kovar, Invar, molybdenum, titanium, cast iron, zinc, magnesium, and other metals and alloys with a sufficiently low CTE and weight. According to one embodiment, the reinforcement 90 may be insert molded within the material of the bezel 18. It should be understood that embodiments of the rearview mirror assembly 10 not including a bezel 18 may still have the reinforcement 90 positioned within the housing 14. When in use, the reinforcement 90 may dominate the thermal expansion properties of the bezel 18, bringing the effective CTE of the bezel 18 closer to the CTE of the first and/or second substrates 26, 34 to reduce stresses generated due to thermal changes and enable similar distances D for the gap 62. The effective CTE of the bezel 18 incorporating the reinforcement 90 may be less than about 60 ppm, less than about 40 ppm, or less than about 20 ppm. It will be understood that the reinforcement 90 may be configured to aid in the reduction, elimination and/or shielding of electromagnetic and radio frequency interference both emanating from, and entering into, the rearview mirror assembly 10. It is also contemplated that this construction can be utilized in a display mirror assembly having a display (e.g., a liquid crystal display, a light emitting diode display or the like) and a glass element which may be an electro-optic element.

Additionally or alternatively to the reinforcement 90, the bezel 18 may comprise a polymeric material having a low enough CTE such that temperature changes in the bezel 18 do not cause undue contraction of the bezel 18 around the electro-optic element 22 and result in stress formation. In various embodiments, the CTE of the polymeric material of the bezel 18 and the housing 14 may be less than about 70 ppm, less than about 60 ppm, less than about 50 ppm, less than about 40 ppm, less than about 30 ppm, less than about 25 ppm, and less than about 20 ppm. Exemplary low CTE polymers may include polyetherimides, filled polyetherimides, liquid crystal polymer, filled liquid crystal polymer, nylon, filled nylon, filled polycarbonate, filled acrylonitrile butadiene styrene, polyamide-imide, filled polyamide-imide, filled polyphenylene sulfide, high density polyethylene, polystyrene and other polymers having a CTE below about 50 ppm. It should be noted that the bezel 18 may include combinations of low CTE polymers as well as combinations of low CTE polymers with regular CTE polymers. Additionally, the bezel 18 may include one or more fillers configured to further reduce the CTE of the bezel 18. Exemplary filler materials may include glasses, metals, minerals, organic materials or ceramics which may lower the overall CTE of the polymer. The filler materials may be in the form of powders, flakes, and fibers. Exemplary fibers may include glass fibers and/or carbon fibers. The bezel 18 may have a volume fraction of filler material greater than about 10%, greater than about 20%, greater than about 30%, greater than about 40%, and greater than about 50%. In a specific example, the bezel 18 may comprise nylon with an approximately 30% by volume glass filler. In some embodiments, the bezel 18 may have different local compositions of polymer or filler material in order to locally minimize the CTE of the bezel 18. For example, corners or long portions at the top and bottom of the bezel 18 may comprise a different polymer or higher volume fraction of filler material than other portions of the bezel 18. It should be understood that in embodiments of the rearview mirror assembly 10 not including the bezel 18, the housing 14 may alternatively comprise the aforementioned materials described in connection with the bezel 18.

By tailoring the use of the reinforcement 90, low CTE polymers in the bezel 18, laser cutting of the first and second substrates 26, 34, and altering the flexibility of the electro-optic element 22, the line-to-line fit between the electro-optic element 22 and the bezel 18, and the small distances of the gap 62, may be achieved without risking fracture of the electro-optic element 22 and bezel 18. In embodiments utilizing the reinforcement 90, the reinforcement 90 may act to restrain the expansion and contraction of the bezel 18 by carrying a portion of the tensile and compression forces generated during temperature change of the bezel 18. By carrying the force, the reinforcement 90 may prevent the bezel 18 from expanding or contracting as much as it may without the reinforcement. In embodiments utilizing low CTE polymers for the bezel 18, the low CTE may reduce the magnitude of size change experienced by the bezel 18, thereby allowing for a smaller gap 62 between the electro-optic element 22 and the bezel 18 without fear of generating hoop stresses in the electro-optic element 22. The use of the reinforcement 90, which has a low CTE, will enable the use of high CTE polymers as a finishing surface (e.g., the bezel first surface 18A) of the bezel 18. Molding with filled polymers, especially fiber filled polymers, may degrade the surface finish of the molded part. Higher quality surface finishes (e.g., of the bezel first surface 18A of the bezel 18) can generally be obtained with polymers with lower volume fractions of filler materials. It will be understood that the filler 80 disposed in the gap 62 can be used in conjunction with low CTE polymer embodiments of the bezel 18 and/or embodiments of the bezel 18 incorporating the reinforcement 90.

Embodiments of the first and second substrates 26, 34 which are formed via laser cutting may have a sufficiently smooth edge 30 and second edge 36, respectively, so as to reduce or remove stress concentrators. Accordingly, if the bezel 18 were to make contact with the electro-optic element 22 as it contracted in low temperatures, the hoop stress would not localize at a point and result in fracture of the electro-optic element 22, but rather be distributed over the smooth edge 30 and second edge 36. Additionally, by utilizing thinner (e.g., between about 0.5 mm and about 1.0 mm) substrates 26, 34 and solution-phase electro-optic material 42 to create a relatively flexible electro-optic element 22, stress generated by contact between the bezel 18 and the electro-optic element 22 may partially be dissipated through flexing of the electro-optic element 22. It should be understood that in some embodiments, the rearview mirror assembly 10 may include some features (e.g., flexible electro-optic element 22 or laser cut first and second substrates 26, 34), but not include others (e.g., reinforcement 90 or solution-phase electro-optic material 42) while still achieving a line-to-line fit between the electro-optic element 22 and the bezel 18.

Referring now to FIGS. 3C-F, depicted are various configurations of the first substrate 26 which have been integrally molded with the bezel 18. Aesthetically, the most desirable gap 62 is no visible gap 62 or a distance D of less than about 25 microns. The bezel 18 can be molded to the first and/or second substrates 26, 34 as an integrated component if the reinforcement 90 is incorporated into polymeric embodiments of the bezel 18, thereby minimizing or eliminating any gap. The bezel 18 may also be formed from a low CTE polymer. Additionally or alternatively, the bezel 18 may be integrally molded to the first and second substrates 26, 34 if the polymeric embodiments of the bezel 18 are filled with a sufficient loading of a CTE reducing filler (e.g., glass fiber or carbon fiber). In integrally molded embodiments, the bezel 18 may be laminated directly to the first and/or second substrates 26, 34 or the bezel 18 may be injection molded around the first and/or second substrates 26, 34 such that the distance D of the gap 62 may be less than about 15 microns, less than about 10 microns, less than about 5 microns or even have no gap 62. An exemplary method of laminating the bezel 18 to the first or second substrates 26, 34 may be accomplished via a method similar to SURFIC™ as developed by Asahi Glass Co. LTD of Chiyoda, Tokyo, Japan and/or glass insert molding performed by Yoshida Technoworks Co., Ltd. of Sumida-ku, Tokyo, Japan. Use of SURFIC™ or the other integrated molding techniques described above would reduce the distance D of the gap 62 between the first substrate 26 and the bezel 18 to near zero and produce an aesthetically pleasing rearview mirror assembly 10.

Figure 3G:
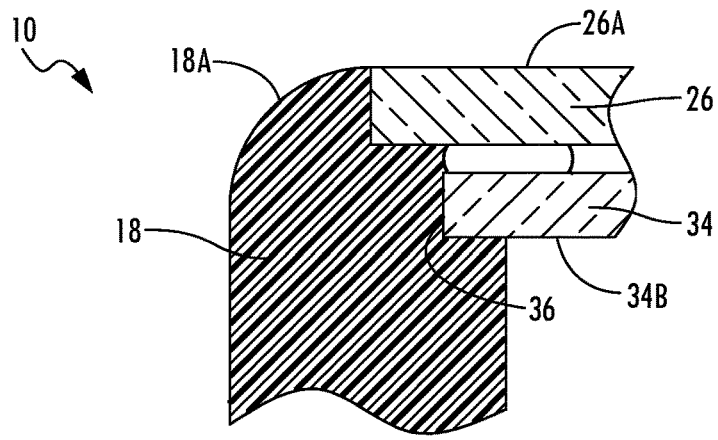
FIG. 3G is an illustration of an enlarged cross-sectional view of the rearview mirror assembly according to yet another embodiment taken at line II of FIG. 1A.
Figure 3H:
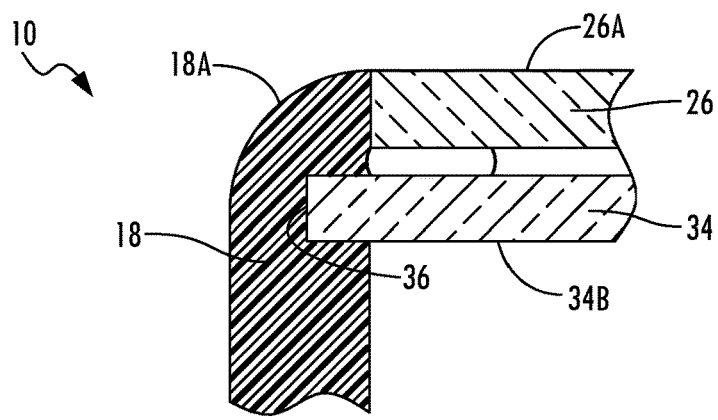
FIG. 3H is an illustration of an enlarged cross-sectional view of the rearview mirror assembly according to yet another embodiment taken at line II of FIG. 1A.
Figure 3I:
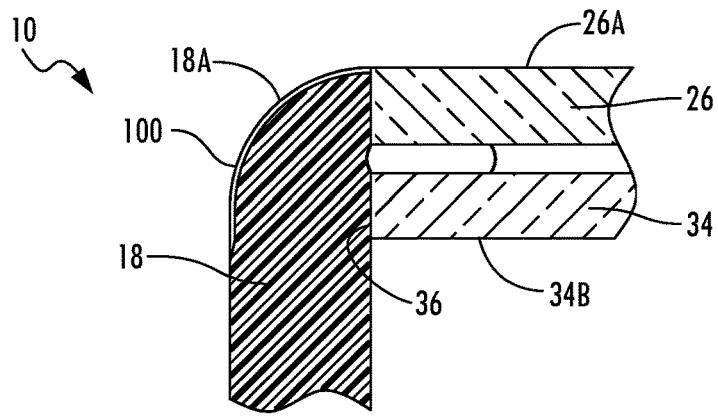
FIG. 3I is an illustration of an enlarged cross-sectional view of the rearview mirror assembly according to yet another embodiment taken at line 11 of FIG. 1A.

Referring now to FIGS. 3G-I, depicted are various configurations of the first substrate 26 and the second substrate 34 which have been integrally molded with the bezel 18. From a structural perspective, contacting the bezel 18 with both the first and second substrates 26, 34 may provide a more robust and secure connection between the bezel 18 and the first and second substrates 26, 34. Various advantages may be achieved through such a design, such as ease of manufacturing (e.g., process and/or mold shutoffs) and enhanced adhesion between the substrates 26, 34 and the bezel 18 through an increase in surface area contact as compared to the embodiments depicted in FIGS. 3C-3F.

With reference again to FIG. 3G, the second edge 36 is positioned inboard, or in an inward direction relative to the bezel 18, of the edge 30. Such an embodiment may be accomplished by using a smaller dimensioned second substrate 34 relative to the first substrate 26, or through positioning of the first and second substrates 26, 34. Increased rigidity of the rearview mirror assembly 10 may be achieved by the bezel 18 contacting both the first and second substrates 26, 34.

Referring now to FIG. 3H, the second edge 36 is positioned outboard, or in an outward direction relative to the bezel 18, of the edge 30. Such an embodiment may be accomplished by using a smaller dimensioned first substrate 26 relative to the second substrate 34, or through positioning of the first and second substrates 26, 34. Exemplary advantages that may be achieved through such an embodiment include a structural "lock" being formed due to the three dimensional aspect of the configuration (e.g., which may increase structural rigidity of the rearview assembly 10) and a reduced dimension bezel 18 (e.g., thinner, reduced and/or more compact) which may be aesthetically pleasing.

Referring now to FIG. 3I, the second edge 36 is positioned substantially flush, or in substantial alignment, with the edge 30. The same or similar advantages of the currently depicted embodiment may be achieved as that of the embodiments depicted in FIGS. 3G and 3H.

Still referring to FIG. 3I, the bezel 18 may include one or more films 100 configured to impart a decorative, aesthetic or function to the bezel 18. An example of a decorative film is disclosed in U.S. Pat. No. 8,827,517, entitled "CLEAR BEZEL," assigned to Gentex Corporation, the entirety of which is hereby incorporated herein by reference. The film 100 may be placed on an A-surface of the bezel 18, imbedded within the bezel 18 and/or combinations thereof. The film 100 may contain decorative coatings on and/or in a polymeric material. Additionally, the film 100 may include one or more metallized layers (e.g., chrome, silver, aluminum). The film 100 may have a refractive index that is close to the electro-optic element 22, the first substrate 26, the electro-optic material 42 and/or the second substrate 34. To form the bezel 18 with the film 100, the film 100 may be placed, or registered, within a mold forming the bezel 18 prior to, or at the same time as, the electro-optic element 22. Potential advantages that may be achieved through use of the film 100 are that the bezel 18 may be imparted with color (e.g., through use of a color or decorative film 100), the addition of a reflector or metallic features (e.g., through use of a metallized layer in the film 100), the concealment of injection molding blemishes (e.g., knit lines and/or injection locations), texture (e.g., through a textured or profiled film 100), feature attachment (e.g., through a connector or attachment point) and/or the shielding of electromagnetic or radio frequency interference (e.g., by incorporating one or more sufficiently thick metallized layers). Further, the film 100 may include one or more electronic components. Exemplary electronic components that may be used in at least a portion of the film 100 include a flex circuit, a component of a pressure based button feature, a membrane switch and/or a capacitive or resistance based sensor. Use of the film 100 with the electronic components may allow the formation of a button or added functionality without seams or edges. It will be understood that the film 100 may include any combination of decorative coating, metallized layer and/or electronic component without departing from the spirit of this disclosure.

To facilitate adhesion between the bezel 18 and the first and/or second substrates 26, 34, one or more adhesion promoters may be included in the material of the bezel 18, in a resin base coating pre-applied to the first and second substrates 26, 34 and/or applied directly to the first and/or second substrates 26, 34. Exemplary adhesion promoters include silane coupling agents such as Dow Corning® Z-6121 and/or Dow Corning® Xiameter OF S-6032 and/or solvent-based organic solutions that may etch the substrates 26, 34 such as LORD Chemlok® primers. It will be understood that although several examples are provided herein, other adhesion promoters, etchants and combinations of adhesion promoters and/or etchants may be used without departing from the spirit of the disclosure. The adhesion promoter used may be selected based at least in part on the material of the bezel 18 and the substrates 26, 34 in order to achieve a desired level of adhesion.

Referring to FIGS. 1A-3I, one or more securement features may be integrally defined by the bezel 18, or otherwise coupled thereto. Exemplary securement features may include screw bosses, snap features and/or locking mechanisms. Such securement features may be advantageous in providing a way to secure other components of the rearview mirror assembly 10 (e.g., the housing 14, the carrier plate 58 and/or the circuit board 54) to the bezel 18. The securement features may be located on the A-surface, B-surface, and/or any position on the bezel 18 where additional support may be desired.

In some embodiments, the electro-optic element 22 may include one or more electrical connectors which are electrically coupled with the electro-optic material 42 and the circuit board 54. Traditionally, electro-optic displays may include a chrome ring or hiding layer having a metal tab which provides electrical communication between the electro-optic display and an electrical board. Use of the electrical connector may facilitate electrical communication between the electro-optic element 22 and the circuit board 54. It is generally contemplated that the electrical connector may include a conductive inkjetted or printed polymer placed on an electrode proximate the electro-optic material 42. A continuous electrical trace may be run from the electrical connector, around the second edge 36, and onto the fourth surface 34B. From there, the trace may be in contact with the circuit board 54 such that the circuit board 54 may drive the electro-optic element 22. In another embodiment, the electrical connector itself may extend around the second edge 36 to the fourth surface 34B.

Figure 3J:
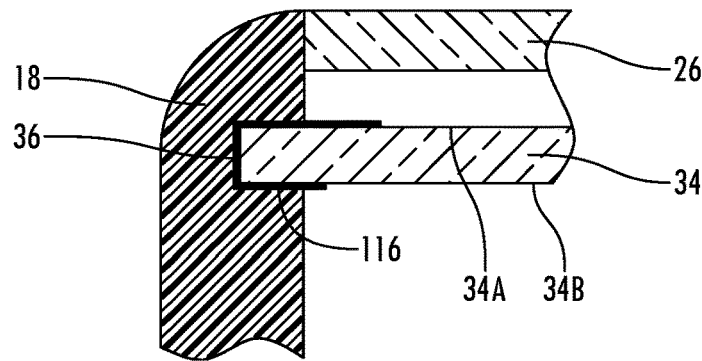
FIG. 3J is an illustration of an enlarged cross-sectional view of the rearview mirror assembly according to yet another embodiment taken at line 11 of FIG. 1A.

Referring now to FIG. 3J, in one or more embodiments an electrical coating 116 may extend from the third surface 34A of the second substrate 34, around the second edge 36 and onto the fourth surface 34B. The electrical coating 116 may be in electrical communication with the electro-optic material 42, an electrical conductor and/or a reflector positioned on the third surface 34A. The electrical coating 116 may be configured as a conductive metallic coating, a conductive organic film, a conductive metal foil and/or a conductive tape. The electrical coating 116 may be thin relative to the second substrate 34. The electrical coating 116 may have an adhesion layer configured to secure the electrical coating 116 which includes a conductive resin. Additionally or alternatively, the electrical coating 116 may be disposed in a recess within the second substrate 34 or in a through hole or via extending through the second substrate 34 such that the electrical coating 116 may extend onto the fourth surface 34B.

Figure 3K:
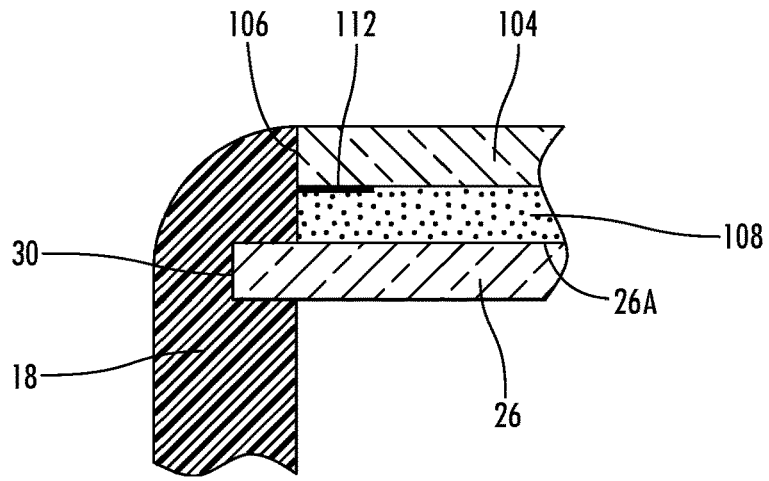
FIG. 3K is an illustration of an enlarged cross-sectional view of the rearview mirror assembly according to yet another embodiment taken at line 11 of FIG. 1A.

Referring to the depicted embodiment of FIG. 3K, the rearview mirror assembly 10 may include a cover glass 104 positioned over the first surface 26A of the first substrate 26. The cover glass 104 may be formed via insert molding as explained above in connection with the electro-optic element 22 such that the bezel 18 may be in contact with a cover edge 106 of the cover glass 104. The cover glass 104 may be coupled to the first surface 26A of the first substrate 26 through an optical coupling adhesive 108 or the cover glass 104 may simply be placed in close contact with the first surface 26A. A backside of the cover glass 104 (e.g., proximate the first surface 26A) or the first surface 26A of the first substrate 26 may optionally include an interactive layer 112. Exemplary interactive layers 112 include a touch panel and/or a capacitive layer configured to be operated by a user of the rearview mirror assembly 10. The cover glass 104 may be used to protect the first and/or second substrates 26, 34 from physical and environmental damage or provide flatness to the rearview mirror assembly 10. In a specific embodiment, the cover glass 104 may be used to protect plastic embodiments of the electro-optic element 22 having plastic substrates from environmental damage related to moisture, gas permeation and/or ultraviolet light exposure. An example of an electro-optic element incorporating plastic substrates is disclosed in U.S. Provisional Patent Application No. 62/257,136, entitled "ELECTRO-OPTIC GAS BARRIER," assigned to Gentex Corporation, the entirety of which is hereby incorporated herein by reference. It will be understood that the first and/or second substrates 26, 34 may be replaced with the cover glass 104 and the remainder of the rearview mirror assembly 10 built around them without departing from the spirit of this disclosure.

One construction of the rearview mirror assembly 10 includes a housing, a bezel and an electro-optic element. The electro-optic mirror element has a first substantially transparent substrate with an edge extending around at least a portion of a perimeter of the first substantially transparent substrate. The rearview mirror assembly also has a second substantially transparent substrate. The first and second substantially transparent substrates define a cavity. An electro-optic material is disposed within the cavity. A gap is defined between the electro-optic mirror element and the bezel. A filler is disposed within the gap such that the filer is substantially flush with a first surface of the electro-optic mirror element and a first surface of the bezel.

Another construction of the rearview mirror assembly 10 includes a housing, a bezel and an electro-optic element. The electro-optic element has a first substantially transparent substrate with an edge extending around at least a portion of a perimeter of the first substantially transparent substrate. The rearview mirror assembly also has a second substantially transparent substrate. The first and second substantially transparent substrates define a cavity. An electro-optic material is disposed within the cavity. The edge of the first substantially transparent substrate and an edge of the bezel are coupled such that substantially no gap is defined between the edge of the first substantially transparent substrate and the edge of the bezel. The bezel and the first substantially transparent substrate are coupled such that the front surface of the glass is substantially flush with a front surface of the bezel.

Figure 4:
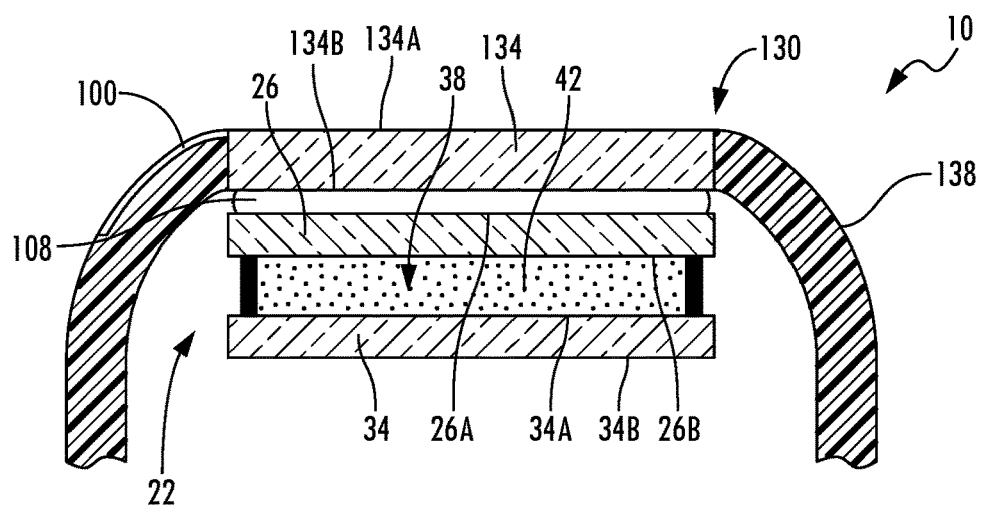
FIG. 4 is a cross-sectional view of the rearview mirror assembly according to yet another example.

Referring now to FIG. 4, depicted is an example of the rearview mirror assembly 10 incorporating a cover plate 130 positioned over the electro-optic element 22. The cover plate 130 includes both a transparency 134 and a cover plate bezel 138. The transparency 134 of the cover plate 130 is optically coupled with the first surface 26A of the first substrate 26 of the electro-optic element 22 though the optical coupling adhesive 108.

The transparency 134 may be composed of a variety of transparent materials transparent in the visible region of the electromagnetic spectrum including soda-lime float glass, EAGLE® glass, alkaline earth boro-aluminosilicate glass, GORILLA® glass, alkali-aluminosilicate glass, chemically strengthened glass, insulated glass, tempered glass, sapphire, optical crystals, diamond, quartz, ceramics, polymers and/or plastics. The transparency 134 may define a front surface 134A and a back surface 134B. The transparency 134 may have a thickness between about 0.1 mm to about 3.0 mm, between about 0.5 mm to about 2.2 mm, or between about 0.8 mm to about 1.6 mm.

The cover plate bezel 138 may be formed of a metal, a polymeric material, or a reinforced (e.g., with fibers or reinforcements of a different material) polymeric material. The cover plate bezel 138 may be transparent, translucent, or opaque. According to various examples, the cover plate bezel 138 may be colored. The cover plate bezel 138 may be formed onto the transparency 134 in any of the manners described in connection with how the bezel 18 (FIG. 1A) is formed onto the first substrate 26. Further, the cover plate bezel 138 may include the film 100 and any of its features and/or components described above. The cover plate bezel 138 may extend in a backward direction around the electro-optic element 22 to conceal edges of the electro-optic element 22.

The optical coupling adhesive 108 is used to optically couple the back surface 134B of the transparency 134 to the first surface 26A of the first substrate 26. The optical coupling adhesive 108 may be a liquid or a solid (e.g., tape) when applied. The optical coupling adhesive 108 may reduce and/or eliminate an air void present between the transparency 134 and the first substrate 26 which may result in reflections and an unaesthetically pleasing appearance. Further, use of the optical coupling adhesive 108 may allow for the transparency 134 and the first substrate 26 to move relative to one another while remaining optically coupled.

Use of the example depicted in FIG. 4 may offer a variety of advantages. First, by optically coupling the first substrate 26 with the transparency 134 through the optical coupling adhesive 108, the transparency 134 and the first substrate 26 may to move relative to one another. Such movement may be advantageous in examples where the transparency 134 and the first substrate 26 are composed of materials having different coefficients of thermal expansion than one another. Second, molding the cover plate bezel 138 to the transparency 134 to form the cover plate 130 may be easier from a manufacturing perspective than molding the bezel 18 directly to the electro-optic element 22. For example, in forming the cover plate bezel 138 to the transparency 134, temperature, pressure and mold shut-off locations may be less critical than in examples where the bezel 18 is formed onto the first substrate 26 of the electro-optic element 22. As such, cost, time and manufacturing complexity may be decreased in examples utilizing the cover plate 130. Third, use of the cover plate 130 allows for both the integration of functional and decorative layers (e.g., the film 100) as well as providing a manner for concealing the sides of the electro-optic element 22.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

What is claimed is:

1. A rearview mirror assembly comprising:
a housing;
a bezel; and
an electro-optic mirror element comprising:
a first substantially transparent substrate having an edge extending around at least a portion of a perimeter of the first substantially transparent substrate;
a second substrate having a second edge extending around at least a portion of a perimeter of the second substrate and a surface, wherein the first substantially transparent substrate and the second substrate define a cavity therebetween; and
an electro-optic material disposed within the cavity,
wherein the edge of the first substantially transparent substrate and the second edge of the second substrate are coupled to at least one of the bezel and the housing.

2. The rearview mirror assembly of claim 1, wherein the edge of the first substantially transparent substrate and the second edge of the second substrate are coupled to the bezel.

3. The rearview mirror assembly of claim 1, wherein the bezel extends onto the surface of the second substrate.

4. The rearview mirror assembly of claim 3, wherein the second edge of the second substrate is positioned outboard of the edge of the first substantially transparent substrate.

5. The rearview mirror assembly of claim 3, wherein the second edge of the second substrate is positioned inboard of the edge of the first substantially transparent substrate.

6. The rearview mirror assembly of claim 3, wherein the edge of the first substantially transparent substrate and the second edge of the second substrate are substantially flush with one another.

7. A rearview mirror assembly comprising:
a bezel; and
an electro-optic mirror element comprising:
a first substrate having an edge extending around at least a portion of a perimeter of the first substrate;
a second substrate having a second edge extending around at least a portion of a perimeter of the second substrate and a surface, wherein the first substrate and the second substrate define a cavity therebetween; and
an electro-optic material disposed within the cavity,
wherein at least one of the edge of the first substrate and the second edge of the second substrate is coupled to the bezel.

8. The rearview mirror assembly of any one of claim 7, further comprising:
a film coupled to the bezel.

9. The rearview mirror assembly of claim 8, wherein the film comprises a metallized layer.

10. The rearview mirror assembly of claim 9, wherein the metallized layer is configured to reduce at least one of radio frequency interference and electromagnetic interference.

11. The rearview mirror assembly of claim 8, wherein the film further comprises:
an electronic component.

12. The rearview mirror assembly of claim 7, wherein at least one of the bezel, the edge and the second edge includes an adhesion promoter.

13. The rearview mirror assembly of claim 7, wherein the bezel defines one or more securement features.

14. The rearview mirror assembly of claim 7, further comprising:
at least one electrical connector, wherein the electrical connector is electrically coupled with the electro-optic material and extends onto the surface of the second substrate.

15. A rearview mirror assembly comprising:
a bezel; and
an electro-optic mirror element comprising:
a first substrate having an edge extending around at least a portion of a perimeter of the first substrate;
a second substrate having a second edge extending around at least a portion of a perimeter of the second substrate and a surface, wherein the first substrate and the second substrate define a cavity therebetween; and
an electro-optic material disposed within the cavity,
wherein the bezel extends onto the surface of the second substrate.

16. The rearview mirror assembly of claim 15, wherein the second edge of the second substrate is positioned inboard of the edge.

17. The rearview mirror assembly of claim 15, wherein the edge is positioned inboard of the second edge.

18. The rearview mirror assembly of claim 15, further comprising:
an electronic component coupled to the bezel.

19. The rearview mirror assembly of claim 15, wherein the bezel extends between the first and second substrates.

20. The rearview mirror assembly of claim 15, further comprising:
an electrical coating positioned on the surface of the second substrate.

* * * * *